(12) United States Patent
Bauman et al.

(10) Patent No.: US 6,477,620 B1
(45) Date of Patent: Nov. 5, 2002

(54) CACHE-LEVEL RETURN DATA BY-PASS SYSTEM FOR A HIERARCHICAL MEMORY

(75) Inventors: Mitchell A. Bauman, Circle Pines, MN (US); Roger L. Gilbertson, Minneapolis, MN (US); Donald R. Kalvestrand, Lonsdale, PA (US); Joseph S. Schibinger, Phoenixville, PA (US); Daniel S. Tokoly, Huntingdon Valley, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/467,190

(22) Filed: Dec. 20, 1999

(51) Int. Cl.[7] .............................................. G06F 12/08
(52) U.S. Cl. ........................ 711/118; 711/122; 711/146
(58) Field of Search ................................. 711/122, 118, 711/146

(56) References Cited

U.S. PATENT DOCUMENTS 4,695,951 A * 9/1987 Hooker et al. ............... 711/121
6,052,760 A * 4/2000 Bauman et al. ............. 711/119
6,167,489 A * 12/2000 Bauman et al. ............. 711/119

* cited by examiner

Primary Examiner—Reginald G. Bragdon
(74) Attorney, Agent, or Firm—Beth L. McMahon; Charles A. Johnson; Mark T. Starr

(57) ABSTRACT

A data by-pass system for a hierarchical, multi-level, memory is disclosed. The by-pass system provides by-pass interfaces between storage devices located at predetermined levels within the memory hierarchy. The hierarchical memory system of the preferred embodiment includes a main memory coupled to multiple first storage devices that each stores addressable portions of data signals retrieved from the main memory. To facilitate a more efficient transfer of data between the various storage devices in the memory system, at least one by-pass interface coupling associated ones of the first storage devices is provided. Data retrieved from a target one of the first storage devices in response to a main memory request can be routed to a different requesting one of the first storage devices via the by-pass system without requiring the use of the main memory data interfaces.

20 Claims, 7 Drawing Sheets

PROCESSING MODULE (POD)

SUB-PROCESSING MODULE (SUB-POD)

CACHE-LEVEL RETURN DATA BY-PASS SYSTEM FOR A HIERARCHICAL MEMORY

CROSS REFERENCE TO OTHER APPLICATIONS

The following issued patents and co-pending applications of common assignee contain some common disclosure:

U.S. Pat. No. 6,167,489 to Bauman et al. "System and Method for By-Passing Supervisors Memory Intervention for Data Transfers Between Devices Having Local Memories" issued Dec. 26, 2000, incorporated herein by reference in its entirety.

"High-Speed Memory Storage Unit for a Multiprocessor System Having Integrated Directory and Data Storage Subsystems", filed Dec. 31, 1997, Ser. No. 09/001,588, now U.S. Pat. No. 6,415,364, incorporated herein by reference in its entirety;

"A Directory-Based Cache Coherency System" filed Nov. 5, 1997, Ser. No. 08/965,004, incorporated herein by reference in its entirety; and "Directory-Based Cache Coherency System Supporting Multiple Instruction Processor and Input/Output Caches", filed Dec. 31, 1997, Ser. No. 09/001,598, incorporated herein by reference in its entirety.

BACKGROUND OF THE INVENTION

1. Field of the Invention

This invention relates generally to an improved system and method for maintaining cache coherency within a hierarchical memory system shared between multiple processors; and more particularly, relates to a system that provides by-pass interfaces to provide for the direct exchange of data between cache memories existing at the lower hierarchical levels in the hierarchical memory system in a manner that maintains memory coherency.

2. Description of the Prior Art

Data processing systems are becoming increasing complex. Some systems, such as Symmetric Multi-Processor (SMP) computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the IPs for storing data signals that are copied from main memory. These cache memories are generally capable of processing requests faster than the main memory while also serving to reduce the number of requests that the main memory must handle. This increases system throughput.

While the use of cache memories increases system throughput, it causes other design challenges. When multiple cache memories are coupled to a single main memory for the purpose of temporarily storing data signals, some system must be utilized to ensure that all IPs and I/O Modules are working from the same (most recent) copy of the data. For example, if a copy of a data item is stored, and subsequently modified, in a cache memory, another IP requesting access to the same data item must be prevented from using the older copy of the data item stored either in main memory or the requesting IP's cache. This is referred to as maintaining cache coherency. Maintaining cache coherency becomes more difficult as more caches are added to the system since more copies of a single data item may have to be tracked.

Many methods exist to maintain cache coherency. Some earlier systems achieve coherency by implementing memory locks. That is, if an updated copy of data exists within a local cache, other processors are prohibited from obtaining a copy of the data from main memory until the updated copy is, returned to main memory, thereby releasing the lock. For complex systems, the additional hardware and/or operating time required for setting and releasing the locks within main memory cannot be justified. Furthermore, reliance on such locks directly prohibits certain types of applications such as parallel processing.

Another method of maintaining cache coherency is shown in U.S. Pat. No. 4,843,542 issued to Dashiell et al., and in U.S. Pat. No. 4,755,930 issued to Wilson, Jr. et al. These patents discuss a system wherein each processor has a local cache coupled to a shared memory through a common memory bus. Each processor is responsible for monitoring, or "snooping", the common bus to maintain currency of its own cache data. These snooping protocols increase processor overhead, and are unworkable in hierarchical memory configurations that do not have a common bus structure. A similar snooping protocol is shown in U.S. Pat. No. 5,025,365 to Mathur et al., which teaches a snooping protocol that seeks to minimize snooping overhead by invalidating data within the local caches at times when other types of cache operations are not occurring. However, the Mathur system can not be implemented in memory systems that do not have a common bus structure.

Another method of maintaining cache coherency is shown in U.S. Pat. No. 5,423,016 to Tsuchiya, which is assigned to the assignee of the current invention. The method described in this patent involves providing a memory structure called a "duplicate tag" that is associated with each cache memory. Each duplicate tag records which data items are stored within the associated cache. When a data item is modified by a processor, an invalidation request is routed to all of the other duplicate tags in the system. The duplicate tags are searched for the address of the referenced data item. If found, the data item is marked as invalid in the other caches. Such an approach is impractical for distributed systems having many caches interconnected in a hierarchical fashion because the time required to route the invalidation requests poses an undue overhead.

For distributed systems having hierarchical memory structures, a directory-based coherency system becomes more practical. Directory-based coherency systems utilize a centralized directory to record the location and the status of data as it exists throughout the system. For example, the directory records which caches have a copy of the data, and further records whether any of the resident copies have been updated. When a cache makes a request to main memory for a data item, the central directory is consulted to determine where the most recent copy of that data item resides. Based on this information, the most recent copy of the data is retrieved so that it may be provided to the requesting cache. The central directory is then updated to reflect the new status for that unit of memory. A novel directory-based cache coherency system for use with multiple Instruction Processors coupled to a hierarchical cache structure is described in the copending application entitled "Directory-Based Cache Coherency System Supporting Multiple Instruction Processor and Input/Output Caches" referenced above and which is incorporated herein by reference in its entirety.

The use of the afore-mentioned directory-based cache coherency system provides an efficient mechanism for sharing data between multiple processors that are coupled to a distributed, hierarchical memory structure. Using such a system, the memory structure may be incrementally expanded to include any multiple levels of cache memory while still maintaining the coherency of the shared data. As the number of levels of hierarchy in the memory system is increased, however, some efficiency is lost when data requested by one cache memory in the system must be retrieved from another cache.

As an example of performance degradation associated with memory requests in a hierarchical cache memory system, consider a system having a main memory coupled to three hierarchical levels of cache memory. In the exemplary system, multiple third-level caches are coupled to the main memory, multiple second-level caches are coupled to each third-level cache, and at least one first-level cache is coupled to each second-level cache. This exemplary system includes a non-inclusive caching scheme. This means that all data stored in a first-level cache is not necessarily stored in the inter-connected second-level cache, and all data stored in a second-level cache is not necessarily stored in the interconnected third-level cache.

Within the above-described system, one or more processors are respectively coupled to make memory requests to an associated first-level cache. Requests for data items not resident in the first-level cache are forwarded to the inter-coupled second-level, and in some cases, the third-level caches. If neither of the intercoupled second or third level caches stores the requested data, the request is forwarded to main memory.

Assume that in the current example, a processor makes a request to the intercoupled first-level cache for a read-only copy of specified data. Assume further that the requested data is not stored in this first-level cache. However, another first-level cache within the system stores a read-only copy of the data. Since the copy of the data is read-only, the request can be completed without involving the other first-level cache. That is, the request may be processed by one of the inter-connected second or third-level caches, or if neither of these caches has a copy of the data, by the main memory.

In addition to requests for read-only copies of data, requests may be made to obtain "exclusive" copies of data that can be updated by the requesting processor. In these situations, the cache line data will be provided to the requesting cache, and any previously cached copies of the data will be marked as invalid. That is, in this instance, copies of the data may not be shared among multiple caches. This is necessary so that there is only one "most-current" copy of the data existing in the system and no processor is working from outdated data. Returning to the current example, assume the request to the first-level cache is for an exclusive copy of data. This request must be passed via the cache hierarchy to the main memory. The main memory forwards this request back down the hierarchical memory structure to the first-level cache that stores the requested data. If this first-level cache stores a shared copy of the cache line, or alternatively stores an exclusive copy that has not been modified, then this first-level cache must invalidate the stored copy of the data, indicating that this copy may no longer be used. If this first-level cache stores an exclusive copy of the data, and has further modified the data, the modified data is passed back to the main memory to be stored in the main memory and to be forwarded on to the requesting first-level cache. In this manner, the requesting cache is provided with an exclusive copy of the most recent data.

The steps outlined above with respect to the exclusive data request are similar to those that must be executed if a read-only copy of the data is requested when a copy of the requested data resides exclusively in another cache. The previous exclusive owner must forward a copy of the updated data to main memory to be returned to the requester.

As may be seen from the current example, in a hierarchical memory system having multiple levels of cache that are not all interconnected by a common bus structure, obtaining an exclusive copy of data that can be utilized by a processor for update purposes may be time-consuming. As the number of these so-called "ownership" requests for obtaining an exclusively "owned" data copy increases within the system, throughput may decrease. This is especially true as additional levels of hierarchy are included in the memory structure.

One mechanism for increasing throughput involves providing a high-speed data return path within the main memory. When data is returned from a previous owner, the high-speed interface forwards the data directly to the requester without the need to perform any type of main memory access. A high-speed interface of this type can be used to route both modified and unmodified data between the various units in the system. Such a system is described in the U.S. Pat. No. 6,167,489 to Bauman et. al. entitled "System and Method for By-Passing Supervisory Memory Intervention for Data Transfers Between Devices Having Local Memories", issued Dec. 26, 2000, and which is referenced above. While this type of interface decreases the time required to complete the data return operation, data must never-the-less be provided to the main memory in all cases before the data can be forwarded to the requesting processor. This unnecessarily increases traffic on interfaces between main memory and other cache memories. Additionally, some latency is still imposed by the length of the data return path, which extends from the lowest levels of memory hierarchy, to main memory, and back to the lowest memory levels. What is needed, therefore, is a system that minimizes the time required to return data to a requesting processor coupled to the hierarchical memory system by shortening the data return path and by reducing request traffic on the main memory interfaces.

3. Objects

The primary object of the invention is to provide an improved shared memory system for a multiprocessor data processing system;

Another object is to provide a hierarchical memory including a main memory coupled to multiple cache memories and further including at least one data return path to provide data between respectively coupled cache memories without intervention of main memory;

A yet further object is to provide data routing logic at multiple levels in a hierarchical memory system for routing data between memories residing within predetermined levels in the memory system and without intervention of a main memory controller;

A still further object is to reduce data traffic on the main memory interfaces of a hierarchical memory system that includes multiple levels of cache memory;

A yet further object is to provide a by-pass data path system for a modular, expandable memory;

Another object is to provide an improved method of transferring shared, read-only copies of data signals from one cache memory to another in a hierarchical memory system in which the cache memories are intercoupled via a directory-based main memory;

Another object is to provide an improved method of transferring exclusive read/write data copies from one cache memory to another in a hierarchical memory system in which the cache memories are intercoupled via a directory-based main memory;

A still further object is to provide an improved system for maintaining cache coherency within a main memory coupled to multiple cache memories; and A further object is to provide a hierarchical, directory-based shared memory system having improved response times.

SUMMARY OF THE INVENTION

The objectives of the present invention are achieved in a hierarchical, multi-level, memory system that provides by-pass paths between storage devices located at predetermined levels within the memory hierarchy. The hierarchical memory system of the preferred embodiment includes a main memory coupled to multiple first storage devices, wherein ones of the first storage devices are third-level cache memories, and other ones of the storage devices are Input/Output (I/O) Buffers. These first storage devices each stores addressable portions of data signals retrieved: from the main memory. A directory-based coherency scheme is employed to ensure that the memory system stores a single, most recent copy of all data signals. According to this scheme, a directory associated with the main memory records the location of the latest copy of any of the data signals stored in the memory system. When a request issued by one of the storage devices is received by the main memory, the directory is consulted to determine which storage device stores the most recent copy of the requested data signals. In some instances, the main memory issues a request to retrieve this latest copy of the data signals from another target storage device in the system so the data can be forwarded by the main memory to the original requester.

To facilitate a more efficient transfer of data between the various storage devices in the memory system, the system includes at least one by-pass interface coupling associated ones of the first storage devices. Data retrieved from a target one of the first storage devices in response to a main memory request can be routed to a different requesting one of the first storage devices via the by-pass system without requiring the use of the main memory data interfaces. The by-pass system includes a control mechanism that performs the routing function based on the identity of the original requester. That is, the request from main memory to the target one of the first storage devices includes the identity of the storage device that issued the original request. If data is returned from the target storage device, a by-pass operation is enabled if the identified requester is one of the storage devices associated with the by-pass interface. According to one embodiment of the invention, the requested data signals are also provided by the target storage device to the main memory only if these data signals comprise an updated copy of the data stored in main memory. This reduces traffic on the main memory interfaces while allowing the main memory to retain an updated data copy. The by-pass system also provides an indication of the occurrence of any by-pass transfer operations to the main memory so that the directory can be updated to reflect the new location of any addressable portion of the data signals.

According to another aspect of the hierarchical memory system, ones of the first storage devices are each coupled to respective second storage devices. In the preferred embodiment, these second storage devices are each second-level cache memories. Each of the second storage devices store data signals retrieved from the coupled first storage device. Requests to retrieve data signals may be provided by a second storage device to a respectively coupled first storage device to be forwarded for processing to main memory. In a manner similar to that discussed above, the main memory may be required to retrieve the latest copy of the requested data signals from a different one of the storage devices in the system, including possibly one of the second storage devices, before the request can be completed.

To make the return of data signals between the second storage devices more efficient, the by-pass system includes at least one interface that allows for the transfer of data directly between predetermined first and second ones of the second storage devices. These by-pass operations are performed in a manner that is similar to that discussed above. The by-pass interfaces thereby significantly reduce the length of the return path during the transfer of data from a target to a requesting storage device. According to one embodiment, data signals are only returned to the main memory when these signals have been modified to reduce traffic on the interfaces in the manner discussed above. In all instances, an indication is provided to the main memory of any by-pass operations so that the directory status may be updated.

The system of the preferred embodiment includes multiple by-pass interfaces coupling respectively associated ones of the second storage devices, and other multiple by-pass interfaces interfacing respectively associated ones of the first storage devices. According to one aspect of the system, the circuits to identify the respectively associated ones of the storage devices are programmable.

According to yet another aspect of the system, the main memory is modular. The by-pass system is adapted to receive data requests from each of the main memory modules for use in generating by-pass responses. The by-pass system is further adapted to route updated data returned from a target storage device to an addressed one of the main memory modules.

The by-pass system includes logic that is capable of transferring various predetermined types of data copies between the storage devices of the hierarchical memory depending on the type of the original data request. In some instances, the by-pass system transfers shared, read-only data copies, whereas in other instances, an exclusive read-write copy is provided. In all situations, an indication of the type and location of each portion of the transferred data signals is provided to the directory so that data coherency is maintained.

One embodiment of the by-pass system allows by-pass responses to be generated before it is known whether a data by-pass operation may be completed. In this embodiment, a by-pass response is generated by the by-pass system upon receipt of a request from the main memory to retrieve specified data from a predetermined target storage device, and before it is known whether the requested data is available within that target storage device. If the data signals can be made available by the target storage device, the pre-generated response is available to be appended to the data signals for immediate routing to the requesting unit. In some instances, the target storage device may not store the requested data signals. This occurs when the target storage device writes the requested data back to main memory after the main memory issued the request to retrieve this data but before the request is received by the target device. In these instances, the pre-generated by-pass response is discarded, and the original request must be processed by main memory instead of by the by-pass system.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE PREFERRED EMBODIMENTS

System Platform

Figure 1:
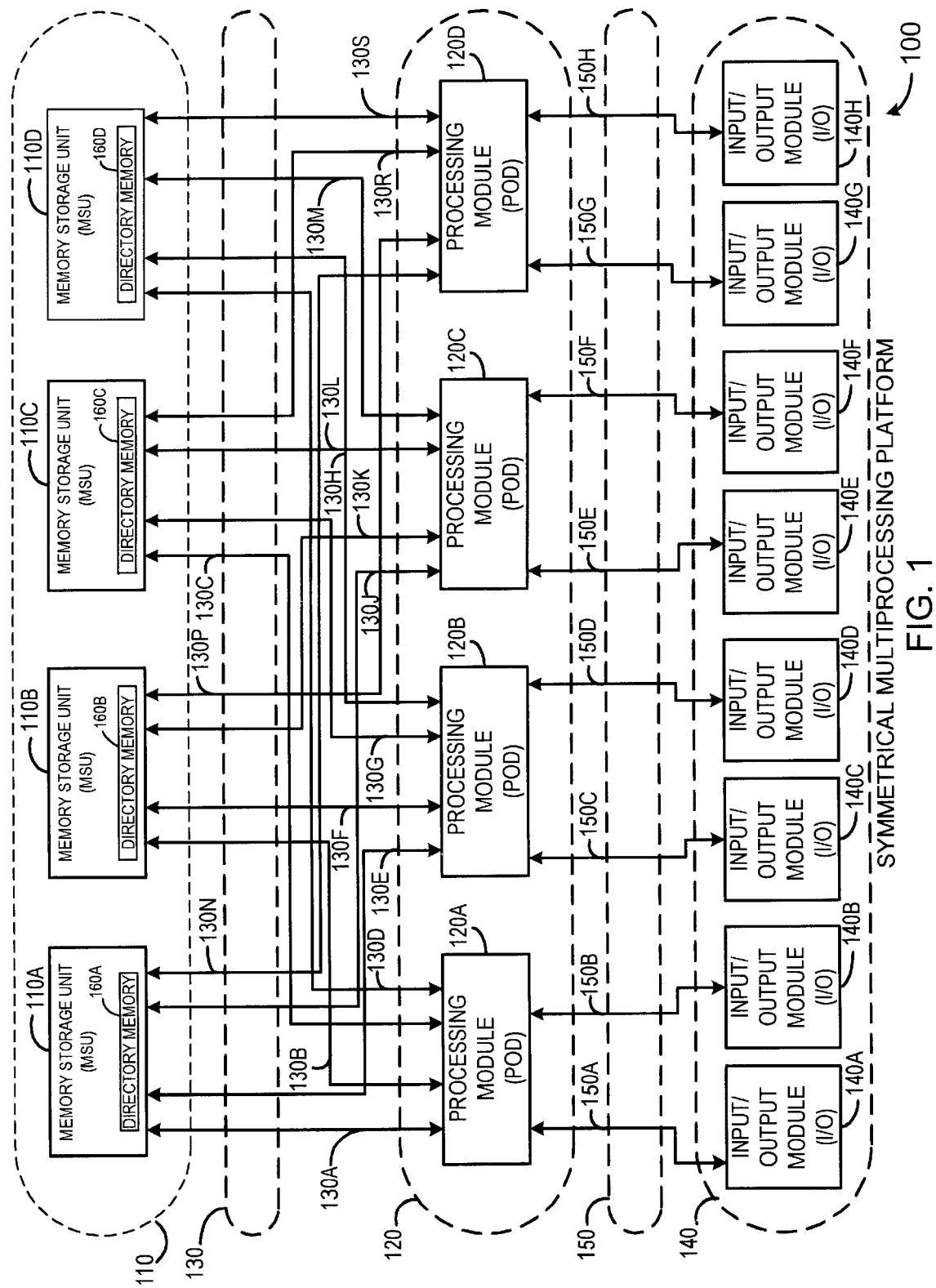
FIG. 1 is a block diagram of a Symmetrical MultiProcessor (SMP) system platform according to a preferred embodiment of the present invention.

FIG. 1 is a block diagram of a Symmetrical Multi-Processor (SMP) System Platform according to a preferred embodiment of the present invention. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

In one embodiment of the present invention, MI 130 comprises separate bi-directional data and bi-directional address/command interconnections, and further includes unidirectional control lines that control the operation on the data and address/command interconnections (not individually shown). The control lines run at system clock frequency (SYSCLK) while the data bus runs source synchronous at two times the system clock frequency (2×SYSCLK).

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but in the preferred embodiment have a transfer rate that is approximately half the transfer rate of the MI Interfaces because the I/O Modules 140 are located at a greater distance from the PODs 120 than are the MSUs 110.

Processing Module (POD)

Figure 2:
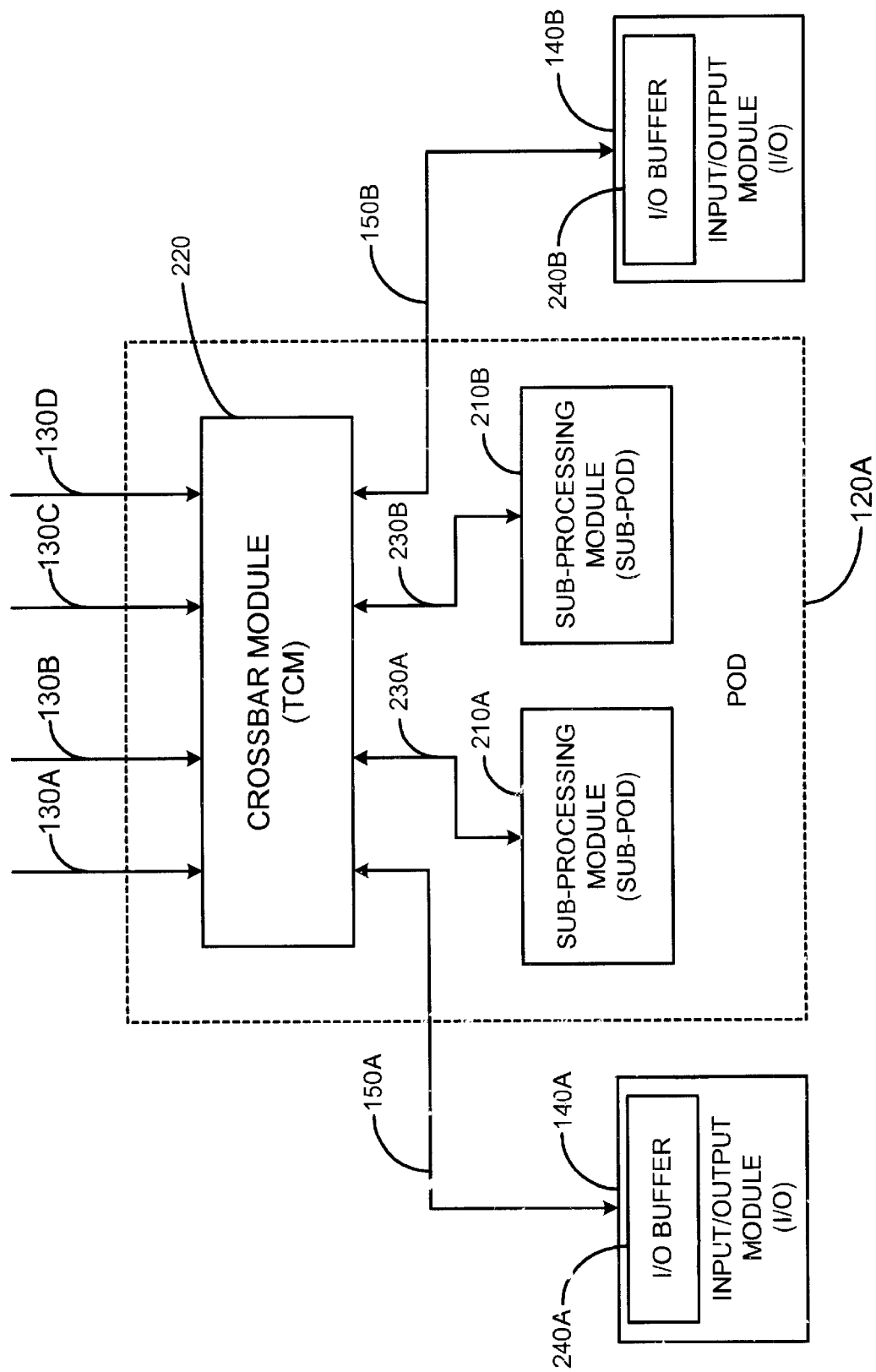
FIG. 2 is a block diagram of a Processing Module.

FIG. 2 is a block diagram of a processing module (POD) according to one embodiment of the present invention. POD 120A is shown, but each of the PODs 120A through 120D has a similar configuration. POD 120A includes two Sub-Processing Modules (Sub-PODs) 210A and 210B. Each of the Sub-PODs 210A and 210B are interconnected to a Crossbar Module (TCM) 220 through dedicated point-to-point Sub-POD Interfaces 230A and 230B, respectively, that are similar to the MI interconnections 130. TCM 220 further interconnects to one or more I/O Modules 140 via the respective point-to-point MIO Interfaces 150. TCM 220 both buffers data and functions as a switch between the Sub-POD Interfaces 230A and 230B, the MIO Interfaces 150A and 150B, and the MI Interfaces 130A through 130D. When an I/O Module 140 or a Sub-POD 210 is interconnected to one of the MSUs via the TCM 220, the MSU connection is determined by the address provided by the I/O Module or the Sub-POD, respectively. In general, the TCM maps one-fourth of the memory address space to each of the MSUs 110A–110D. According to one embodiment of the current system platform, the TCM 220 can further be configured to perform address interleaving functions to the various MSUs. The TCM may also be utilized to perform address translation functions that are necessary for ensuring that each processor (not shown in FIG. 2) within each of the Sub-PODs 210 and each I/O Module 140 views memory as existing within a contiguous address space as is required by certain off-the-shelf operating systems.

In one embodiment of the present invention, I/O Modules 140 are external to Sub-POD 210 as shown in FIG. 2. This embodiment allows system platform 100 to be configured based on the number of I/O devices used in a particular application. In another embodiment of the present invention, one or more I/O Modules 140 are incorporated into Sub-POD 210. Each of the I/O Modules includes an I/O Buffer shown as 240A and 240B of FIG. 2. These I/O Buffers may be cache memories that include tag and coherency logic as is known in the art.

Sub-Processing Module

Figure 3:
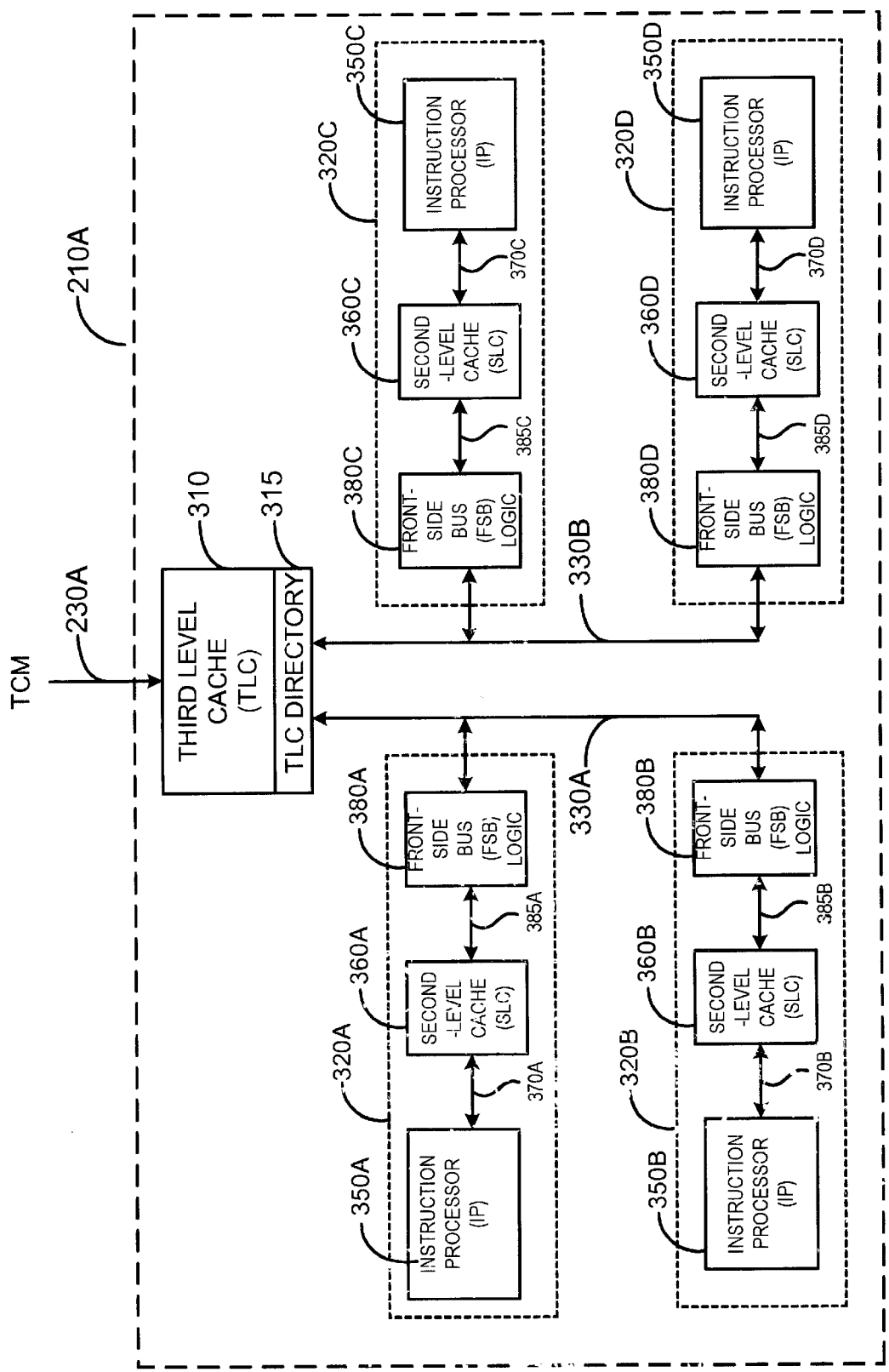
FIG. 3 is a block diagram of the Sub-Processing Module.

FIG. 3 is a block diagram of a Sub-Processing Module (Sub-POD). Sub-POD 210A is shown, but it is understood that all Sub-PODs 210 have similar structures and interconnections. In this embodiment, Sub-POD 210A includes a Third-Level Cache (TLC) 310 and one or more Coherency Domains 320 (shown as Coherency Domains 320A, 320B, 320C, and 320D). TLC 310 is connected to Coherency Domains 320A and 320B via Bus 330A, and is connected to Coherency Domains 320C and 320D via Bus 330B. TLC 310 caches data from the MSU, and maintains data coherency among all of Coherency Domains 320, guaranteeing that each processor is always operating on the latest copy of the data.

Each Coherency Domain 320 includes an Instruction Processor (IP) 350 (shown as IPs 350A, 350B, 350C, and 350D). Each of the IPs includes a respective First-Level Cache (FLC). Each of the IPs is coupled to a Second-Level Cache (SLC) 360 (shown as SLC 360A, 360B, 360C and 360D) via a respective point-to-point Interface 370 (shown as Interfaces 370A, 370B, 370C, and 370D). Each SLC further interfaces to Front-Side Bus (FSB) Logic 380 (shown as FSB Logic 380A, 380B, 380C, and 380D) via a respective one of Interfaces 385A, 385B, 385C, and 385D. FSB Logic is also coupled to a respective one of Buses 330A or 330B.

In the preferred embodiment, the SLCs 360 operate at a different clock speed than Buses 330A and 330B. Moreover, the request and response protocols used by the SLCs 360 are not the same as those employed by Buses 330A and 330B. Therefore, FSB logic is needed to translate the SLC requests into a format and clock speed that is compatible with that used by Buses 330.

Directory-Based Data Coherency Scheme of the System Architecture

Before discussing the data by-pass system of the current invention in more detail, the data coherency scheme of the current system is discussed. Data coherency involves ensuring that each processor within Platform 100 operates on the latest copy of the data, wherein the term "data" in the context of the current Application refers to both processor instructions, and any other types of information such as operands stored within memory. Since multiple copies of the same data may exist within platform memory, including the copy in the MSU 110 and additional copies in various local cache memories (local copies), some scheme is needed to control which data copy is considered the "latest" copy.

The platform of the current invention uses a directory protocol to maintain data coherency. In a directory protocol, status information is associated with units of data stored within the main memory. In the preferred embodiment, status information is stored in Directory Memories 160A, 160B, 160C, and 160D of FIG. 1 for each 64-byte segment of data, or "cache line", residing within the MSUs 110. For example, the status information describing a cache line of data stored in MSU 110A is stored in Directory Memory 160A, and so on. Status information is monitored and updated by a controller when a copy of a cache line is requested by one of the Sub-PODs 210 so that the Directory Memories record which Sub-PODs 210 or I/O Modules 140 have copies of each cache line in the system. The status also includes information on the type of copies that reside within the system, as is discussed below. In the present invention, a cache line copy may be one of several types. Copies residing within caches in the Sub-PODs may be either "shared" or "exclusive" copies. If a cache line is shared, one or more Sub-PODs may store a local copy of the cache line for read-only purposes. A Sub-POD having shared access to a cache line may not update the cache line. Thus, for example, Sub-PODs 210A and 210B may have shared access to a cache line such that a copy of the cache line exists in the Third-Level Caches 310 of both Sub-PODs for read-only purposes.

In contrast to shared status, exclusive status, which is also referred to as "exclusive ownership", may be granted to only one Sub-POD at a time for any given cache line. When a Sub-POD has exclusive ownership of a cache line, no other Sub-POD may have a copy of that cache line in any of its associated caches. A cache line is said to be "owned" by the Sub-POD that has gained the exclusive ownership.

A Sub-POD is provided with a copy of a cache line after the Sub-POD makes a fetch request on Sub-POD Interface 230A to the TCM 220. The TCM responds by providing a fetch request to the appropriate MSU 110 based on the cache line address. The type of fetch request made to memory is determined by the type of cache line copy that is requested by the Sub-POD.

A. Fetch Copy Requests

When a Sub-POD requests a read-only copy of a cache line, the TCM responds by issuing a "Fetch Copy" command to the addressed one of MSUs 110A–110D on the command lines of the corresponding MSU Interface (MI) 130. At the same time, the cache line address is asserted on the MI address lines. The MSU receiving this request consults its Directory Memory 160 to determine the current status of the requested cache line. If the MSU stores the most recent copy of the cache line as indicated by a cache line status of "Present", the MSU can provide the cache line data accompanied by a response indication directly to the requesting Sub-POD 210 via the TCM on MI 130. The response indication is encoded on unidirectional, MSU-to-TCM control lines included within each of the MIs 130.

The MSU may not have the most recent copy of the cache line because another Sub-POD is the exclusive owner of the data. In this instance, the MSU must request that this owner Sub-POD return any updated data to the MSU. To accomplish this, the MSU issues a "Return Function" to the owner Sub-POD via the associated TCM 210. The Return Function is encoded on the command lines of the MI 130, along with the address of the requested cache line, is received by the associated TCM, and forwarded to the target Sub-POD.

Several types of Return Functions exist. In the current example, the requesting Sub-POD is requesting a read-only, shared copy of the cache line. This means that although the owner Sub-POD must provide any cache line updates to the MSU so these updates can be provided to the requesting Sub-POD, the owner Sub-POD may also keep a read-only copy of this cache line. To communicate this, the MSU issues a special Return Function called a "Return Keep Copy". The TCM responds by returning the requested cache line on the data lines of the MI 130, and by further asserting a "Return Command" on the MI command lines. If this Sub-POD retains a read-only copy of the cache line, that Sub-POD is no longer considered the "owner", since no write operations may be performed to the cache line. Thus, the Sub-POD is said to return both data and ownership to the MSU with the Return Command.

After data is returned from the Sub-POD, a special POD-to-POD interface within the MSU routes the data from the returning MI 130 to the MI associated with the requesting unit. This POD-to-POD interface is described in the above-referenced application entitled "System and Method for By-Passing Supervisory Memory Intervention for Data Transfers Between Devices Having Local Memories". It may be noted that data is routed in this manner even if the previous owner did not modify the cache line. Providing unmodified returned data in this manner is more expedient then reading the cache line from the MSU. The returned data need only be written back to the MSU if the cache line was actually modified as is indicated by the type of Return Command issued by the Sub-POD. A Sub-POD issues a "Return Block" command to indicate the presence of a modified cache line, whereas a "Return Fast" command is issued to indicate the return of an unmodified cache line. In either instance, the MSU Directory Memory 160 is updated to reflect the new cache line status.

B. Fetch Original Requests

In a manner similar to that discussed above with regards to read-only cache line copies, a Sub-POD gains exclusive ownership of a cache line by making a "Fetch Original" fetch request to the MSU via the TCM 220, which encodes the request on the command lines of the MI 130. In response, the MSU may provide the cache line directly if the cache line is "Present" in the MSU such that no other Sub-POD has a copy of the cache line.

When a Sub-POD makes a request to gain exclusive ownership of a cache line, and the cache line is stored within another Sub-POD in the system, the request is handled in one of several ways. If another Sub-POD has exclusive ownership of the cache line, the MSU issues a Return Function to the owner Sub-POD requesting the return of the cache line data in the manner discussed above. In this instance, a "Return Purge" function is issued to indicate that the previous Sub-POD owner may not keep a copy of the cache line, but instead must purge it from all cache memories. This is necessary since only one Sub-POD may have exclusive ownership of a cache line at one time.

Upon receipt of the Return Purge function, the Sub-POD determines whether the cache line has been modified. If so, the Sub-POD returns both the data and ownership to the MSU by directing the corresponding TCM 220 to issue a Return Command on the MI 130. Alternatively, if the owner Sub-POD has not modified the cache line, the Sub-POD may return just the ownership to the MSU:using a "Return Fast" command in the manner discussed above. In this instance, the owner Sub-POD may not keep a copy of the cache line for any purpose, and the cache line is marked as invalid in the local cache.

The MSU responds to the Return Commands by providing the most recent cache line data, along with exclusive ownership, to the requesting Sub-POD via the associated TCM. The MSU provides this response by encoding an acknowledgment on the command lines of the MI along with the data provided on the MI data lines. Additionally, the MSU updates the corresponding Directory Mernory 160 with the cache line status indicating the new Sub-POD owner, and stores any returned data.

The above description relates to the return of data when a requested cache line is exclusively owned by another Sub-POD. According to another scenario, the cache line may reside as a read-only, shared copy within a cache of one or more Sub-PODs. In this instance, the MSU issues a "Purge Function" to these Sub-PODs such that all local copies are invalidated and can no longer be used. The MSU then provides the cache line and ownership to the requesting Sub-POD and updates the Directory Memory status in the manner discussed above.

C. Fetch Conditional Requests

In instances in which the Sub-POD is requesting an operand, the TCM issues a "Fetch Conditional" command to the addressed MSU 110. Upon receipt of this command, the MSU consults the state of the cache line in Directory Memory 160. If the cache line data must be retrieved from another Sub-POD, an optimization algorithm is used by the MSU to determine whether a "Return Keep Copy" or a "Return Purge" is issued to the Sub-POD. In other words, the algorithm determines whether an exclusive or shared copy of the cache line will be provided to the requesting Sub-POD. The algorithm, which is largely beyond the scope of the current invention, is based on the current cache line state, and is designed to optimize the sharing of operand data, whenever possible, so that performance is enhanced. After the selected Return function is issued by the MSU to the owner Sub-POD, Fetch Conditional Requests are handled in the manner discussed above with respect to other Fetch requests.

D. Flush Operations

In addition to returning cache line data to the MSU 110 following the receipt of a Return Function, Sub-PODs may also provide data to the MSU in other situations. For example, a Sub-POD may provide data to be written back to an MSU during Flush operations. When a Sub-POD receives a cache line from an MSU, and the cache line is to be copied to a cache that is already full, space must be allocated in the cache for the new data. Therefore, a predetermined algorithm is used to determine which older cache line(s) will be disposed of, or "aged out of", cache to provide the amount of space needed for the new information. If the older data has never been modified, it may be merely overwritten with the new data. However, if the older data has been modified, the cache line including this older data must be written back to the MSU 110 during a Flush Operation so that this latest copy of the data is preserved.

F. I/O Operations

As discussed above, cache lines residing within a Sub-POD will have either a shared or exclusive status. Other types of status indications are used when a cache line resides within a storage device of an I/O Module 140 shown as I/O Buffers 240A and 240B of FIG. 2. For example, a status of "I/O Copy" is used to describe a read-only copy of a cache line stored within an I/O Buffer 240. In a manner similar to that described above for shared cache lines, a cache line in the I/O Copy state may not be modified. Unlike a cache line having a status of "shared", a cache line in the I/O Copy state may only be stored in one I/O Buffer at a time. No other TLC or I/O Module may have a copy of any kind, shared or exclusive, while an I/O Module has an I/O Copy of a cache line.

I/O Buffers 240 may also store exclusive copies of cache lines. Such cache lines are said to have a status set to "I/O Exclusive". Both read and write operations may be performed to a cache line that is exclusively owned within an I/O Buffer. Unlike cache lines that are exclusively owned by a Sub-POD (that is, have a status of "exclusive"), a cache line that is exclusively owned by an I/O Buffer will remain in the I/O Buffer until the I/O Module flushes the data back to the MSU without prompting. The MSU will not initiate a Return operation when the cache line is in this state, and any requests for the cache line will remain pending until the I/O Module performs a flush operation.

Finally, as indicated above, a cache line may have a status of "Present". This status is assigned to the cache line when the MSU has the most current copy of the data and no other Sub-PODs or I/O Modules have a valid local copy of the data. This could occur, for example, after a Sub-POD or I/O Module having an exclusive copy of the cache line performs a Flush operation so that the MSU thereafter has the only valid copy of the data. This status indication is also assigned to a cache line after an I/O Module initially stores that cache line in the MSU during what is referred to as an "I/O Overwrite" operation. An I/O Overwrite is performed whether or not any other Sub-PODs or I/O Modules have local copies of the overwritten cache line. The MSU issues a Purge function to these Sub-PODs or I/O Modules so that the outdated data is invalidated.

Coherency Scheme Within a Sub-POD

As discussed above, in the system of the preferred embodiment, directory information is stored in Directory Memories 160 in the MSU to record which of the Sub-POD (s) or I/O Modules store particular cache lines. The MSU directory does not, however, indicate which of the cache memories within a Sub-POD has a copy of the cache line. For example, within a Sub-POD, a given cache line may reside within the TLC 310, one or more SLCs 360, and/or one or more First-Level Caches of a Sub-POD IP. Information pertaining to the specific cached data copies is stored in a directory memory within the TLC.

In a manner similar to that described above with respect to the MSU, the TLC stores status information about each cache line in TLC Directory 315 of FIG. 3. This status information indicates whether the TLC was granted either exclusive ownership or a read copy of a particular cache line by the MSU 110. The status information also indicates whether the TLC has, in turn, granted access to one or more SLCs in the respective Sub-POD. If the TLC has exclusive ownership, the TLC may grant exclusive ownership to one of the SLCs 360 in a Sub-POD 210 so that the IP 350 coupled to the SLC may update the cache line. Alternatively, a TLC having exclusive ownership of a cache line may also grant a read copy of the cache line to multiple ones of the SLCs in a Sub-POD. If the TLC only has a read copy of a cache line, the TLC may grant a read copy to one or more of the SLCs 360 in a Sub-POD 210 such that the interconnected IP may read, but not write, the cache line. In this case, the TLC may not grant any of the SLCs write access to the cache line.

The TLC tracks the copies that exist within a Sub-POD by recording an indicator identifying one or both of the Buses 330 to which it is coupled. For example, if TLC 310 granted exclusive ownership of a cache line to SLC 360A, the indicator stored in the TLC directory for that cache line identifies Bus 330A as having exclusive ownership. If TLC 310 granted read copies to both SLCs 360A and 360C, the TLC directory identifies both Buses 330A and 330B as having read copies.

When data is provided to an SLC 360, it may also be provided to the respective First-Level Cache (FLC) within the IP 350 coupled to that SLC. Generally, whenever an IP requests a read copy of data, the read copy will be provided by the SLC to be stored within the IP's FLC. An exception to this rule occurs for certain system-level clock information that will become outdated, and therefore is not forwarded to the FLC. In contrast to read data, a cache line that is obtained by the SLC from the TLC on an exclusive ownership basis is not generally forwarded to the FLC for storage. An exception to this rule occurs for certain resources that are associated with software locks, and which must be cached within the FLC until the IP releases the lock. The SLC includes Tag RAM Logic (not shown in FIG. 3) to record whether the associated FLC stores a copy of a particular cache line, and which is largely beyond the scope of this invention.

As discussed above, the directory status information stored within the MSU 110 is used to maintain data coherency throughout the entire system. In a similar manner, the directory status information within the TLC is used to maintain data coherency within the respective Sub-POD 210. Within the Sub-POD, data coherency is maintained for each of the Buses 330, and is also maintained for the Sub-POD as a whole.

Data coherency is maintained for each of the Buses 330 using a snooping mechanism. If an IP 350 makes a request for an address that is not present in either the respective FLC or SLC, the SLC initiates a request via the respective FSB Logic 380 to the associated Bus 330. The request will indicate the type of request (read or write), and will also indicate the request address. Each SLC monitors, or "snoops" the Bus 330 via its respective FSB logic for these types of requests from the other SLC on Bus 330. When such a request is detected, the SLC that detected the request checks its internal Tag RAM to determine whether it stores a modified copy of the requested data. If it does store a modified copy of the requested data, that data is provided on Bus 330 so that a copy can be made within the requesting SLC. Additionally, if the requesting SLC is requesting exclusive ownership of the data, the other (non-requesting) SLC must also mark its resident copy as invalid, since only one SLC may have write ownership at a given time. Furthermore, if the SLC detecting the request determines that its associated FLC also stores a copy of the cache line that is requested for exclusive ownership, that SLC must direct the FLC to invalidate its local copy.

If an SLC is requesting a cache line that has not been modified by the other SLC that resides on the same Bus 330, the TLC 310 will handle the request. In this case, the SLC presents the request to Bus 330, and because the associated SLC does not respond to the request in a pre-determined period of time with snoop results, the TLC handles the request.

A TLC 310 processes requests from the SLCs in the associated Sub-POD by determining if that Sub-POD has been granted the type of access that is being requested, and if so, by then determining how the requested cache line may be obtained. For example, a TLC may not grant exclusive ownership of a cache line to an SLC if the TLC itself has not been granted exclusive ownership. If the TLC has been granted exclusive ownership, the TLC must further determine if the other (non-requesting) Bus 330 has, in turn, been granted exclusive ownership. If the other Bus 330 has exclusive ownership of the data, the TLC issues a request to that Bus to initiate return of the data. Because the SLCs are snooping the Bus, this request will be detected, and an SLC owning the data will return any modified copy of the data to the TLC. Additionally, any copies of the requested cache line residing within the caches of the previous owner SLC will be marked as invalid. The TLC may then provide the data to the requesting SLC and update its directory information to indicate that the other Bus 330 now has the exclusive ownership.

A similar mechanism is used if the SLC is requesting read access. If the TLC has been granted read access by the MSU for the requested cache line, the data is provided to the requesting SLC and the directory information is updated to reflect that the associated Bus 330 has read access of the data. Both Buses may be granted read access to the cache line simultaneously.

In yet another scenario, the TLC may not have a copy of the requested cache line at all, or may not have the type of access that is requested. This could occur for a number of reasons. For example, a TLC may obtain a copy of a cache line from the MSU, provide it to one or more of the SLCs in its Sub-POD, then later age the cache line out of memory to make room for another cache line. This aging out of the cache line in the TLC may occur even though an SLC in the Sub-POD still retains a copy. This is allowed because the cache memories of the preferred embodiment are not inclusive caches. That is, each cache line residing within an SLC does not necessarily reside in the associated TLC 310. As a result of this non-inclusive cache configuration, a request by any of the SLCs in the Sub-POD for the cache line may result in a cache miss at the TLC even if the cache line is stored in another SLC within the same Sub-POD. A cache miss could also occur because the requested cache line does not reside in the TLC or in any other one of the caches in the respective Sub-POD, In yet another instance, an SLC may be requesting exclusive ownership of a cache line, but the associated TLC has only been granted a read copy of a requested cache line. In any of these cases, the TLC must make a request for the cache line via the associated Sub-POD Interface 230 to the TCM 220, which then issues an appropriate fetch request on the MI 130 to the addressed MSU 110 as described above.

After a TCM makes a request via the respective MI Interface for access to a cache line, the request is presented to MSU 110, and the directory logic within the MSU determines where the most current copy of the data resides. This is accomplished in the manner discussed above. If the MSU owns the most recent copy of the data, the data may be provided immediately to the requesting TLC with the requested permission as either a read copy or with exclusive ownership. Similarly, if only a read copy of the data is being requested, and the MSU has granted only read copies to other Sub-PODs 210, the MSU may immediately provide the additional read copy to the requesting TLC. However, if exclusive ownership is being requested, and the MSU has already granted exclusive ownership to another Sub-POD, the MSU must initiate a Return operation so that the TLC currently owning the data returns any updated data. These MSU requests may take a substantial amount of time, especially if a large number of requests are already queued to use the MI 130 associated with Sub-PODs having current copies of the requested cache line.

From the above discussion, it is apparent that the necessity to return data from a Sub-POD to the MSU for forwarding to the same Sub-POD, or a different Sub-POD, may substantially increase the time required to gain exclusive ownership prior to performing a write operation. This is particularly true if a large number of requests are being processed across the MI Interfaces. The current invention minimizes the time required to obtain exclusive ownership in the cases involving routing of data between the two Sub-PODs within the same POD. The current invention also minimizes the time requested to transfer data between two SLCs in the same Sub-POD in those instances in which the TLC did not have a record of the cache line. Recall that this may occur when the TLC ages out a cache line that was still stored in one of the SLCs in its Sub-POD, so that when a request for the cache line is presented to the TLC, the TLC does not initiate the return of data from the owning SLC within that Sub-POD. In this instance, the TLC forwards the request to the MSU, which initiates a return operation to the same Sub-POD that originated the request.

Description of the Data By-Pass System of the Current Invention

The current invention provides a by-pass system that directly routes returned cache line data between the two Sub-PODs 210A and 210B in those instances in which the requesting Sub-POD and the owner Sub-POD are in the same POD 120A. The system also provides logic to enable a Sub-POD to route cache line data from one Bus 330 to another in those situations in which the non-inclusive TLC has aged out a cache line still residing in one of the associated SLCs. Use of these "by-pass operations" significantly reduces the time required to gain access to a cache line, and also reduces the traffic on MIs 130.

Figure 4:
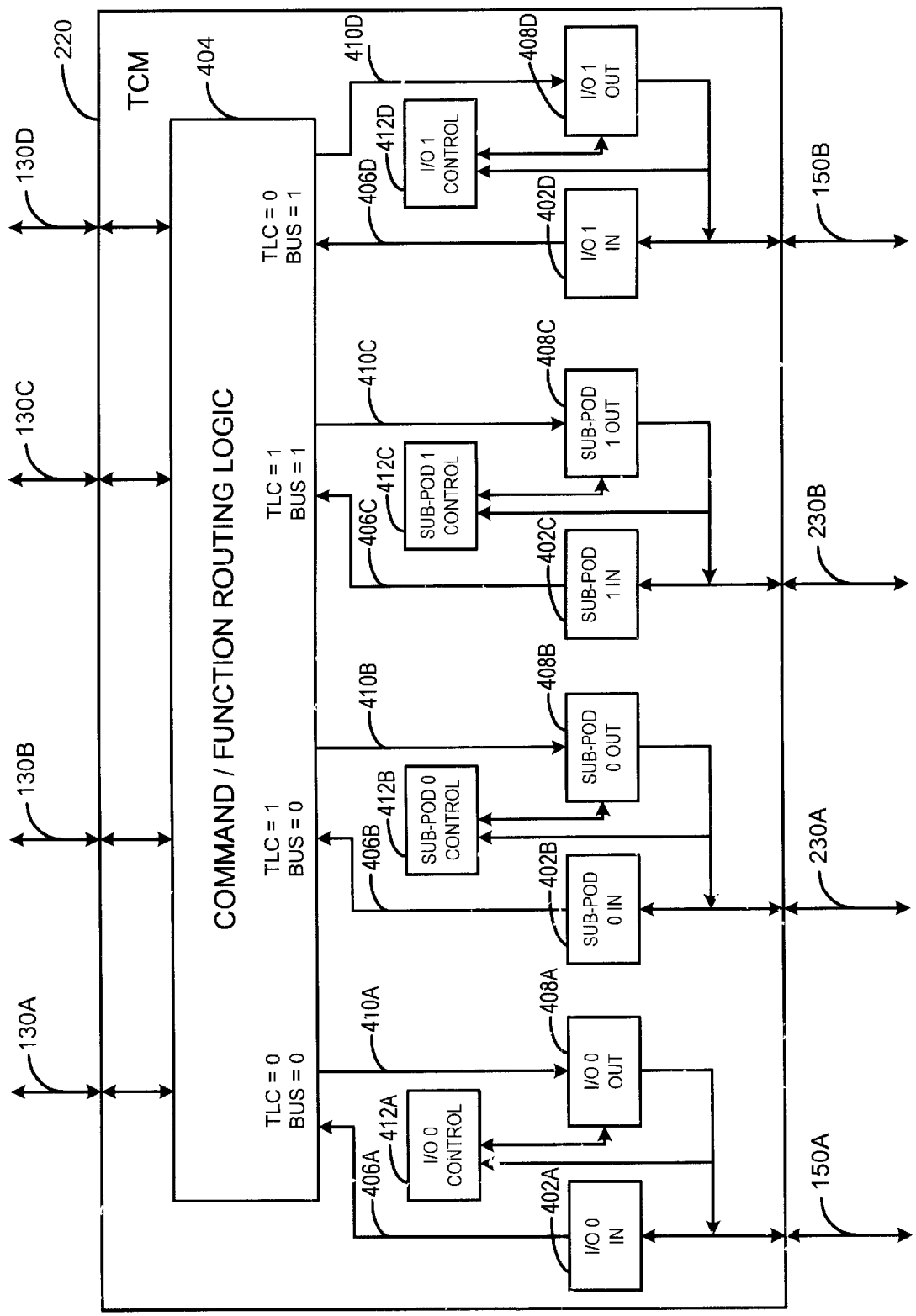
FIG. 4 is a block diagram of the TCM of the preferred embodiment.

FIG. 4 is a block diagram of the TCM of the preferred embodiment. The TCM receives requests from Sub-POD 210A and 210B on Sub-POD Interfaces 230A and 230B, respectively. TCM further receives requests from I/O Modules 140A and 140B via MIO Interfaces 150A and 150B, respectively. Each of these four interfaces is associated with a storage device for temporarily storing requests received from the respective interface. These storage devices are shown as I/O 1 IN 402A, Sub-POD 0 IN 402B, Sub-POD 1 IN 402C, and I/O 1 IN 402 D. The requests stored in these storage devices are received by Command/Function Routing Logic 404 on Input Interfaces shown as 406A, 406B, 406C, and 406D, and are processed according to a predetermined priority scheme.

Command/Function Routing Logic 404 translates the requests provided by the I/O Modules and Sub-PODs to a format that is compatible with the MIs 130, and routes the translated requests to the appropriate one of the MI based on the request address. As mentioned above, each MI services a respective MSU 110, with each MSU providing storage for one-fourth of the memory address space of Platform 100.

In addition to routing requests received from the I/O Modules and Sub-PODs to the addressed MSUs, the TCM also routes functions received from the MSUs via MIs 130 to the appropriate Sub-POD or I/O Module. As discussed above, these functions initiate various Return and Purge operations so that memory coherency is maintained in Platform 100. When a function is received on one of the MIs, it is stored in Command/Function Routing Logic 404, and is eventually handled according to a predetermined priority scheme. When selected for processing, it will be translated to the format required by the I/O Modules and Sub-PODs, and routed to the appropriate one of the output storage devices associated with either an MIO Interface 150 or a Sub-POD Interface 230. These storage devices are shown as I/O 0 OUT 408A, Sub-POD 0 OUT 408B, Sub-POD 1 OUT 408C, and I/O 1 OUT 408D. These devices interface to Command/Function Routing Logic via Output Interfaces 410A, 410B, 410C, and 410D, respectively. The functions stored in the output storage devices are provided to corresponding I/O Module or Sub-POD as controlled by the respective control logic shown as I/O 0 Control 412A, Sub-POD 0 Control 412B, Sub-POD 1 Control 412C, and I/O 1 Control 412D. The control logic uses control lines included in the respective MIO or Sub-POD Interface to determine when the transfer of the function to the I/O Module or Sub-POD may occur.

Figure 5:
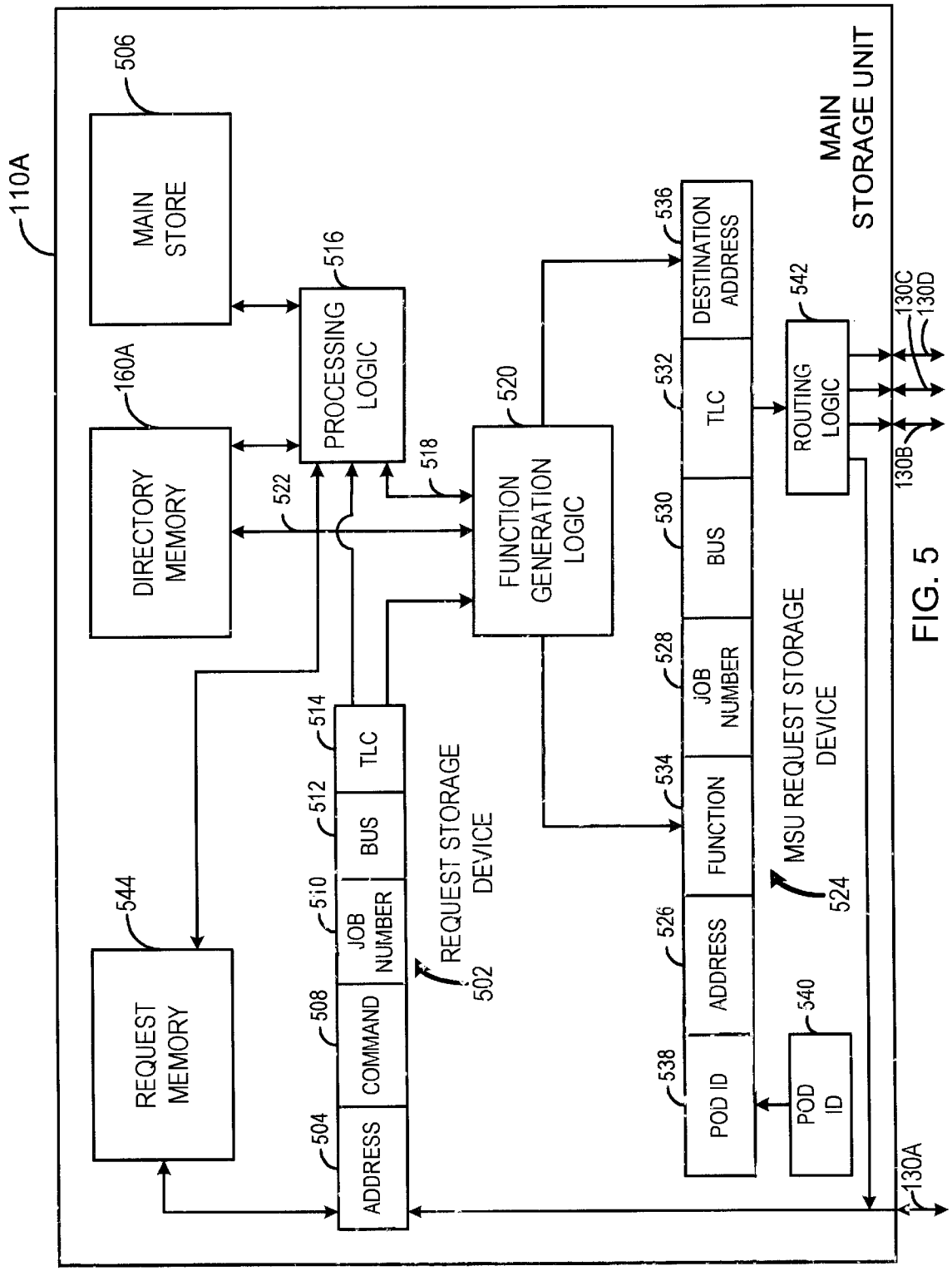
FIG. 5 is a block diagram of the Main Storage Unit.

FIG. 5 is a block diagram of the Main Storage Unit (MSU) 110A. Although MSU 110 A is shown and described, it will be understood that the following description applies equally to all MSUs in Platform 100. MSU 110A may receive a request on one or more of the MIs 130A, 130B, 130C and 130D at a given time. A request received on MI 130A is stored in Request Storage Device 502, which is capable of storing multiple requests. Each of the MIs is associated with a similar Request Storage Device.

A request received from the MI includes several fields. Field 504 includes the request address, which is an address mapped to the address space of the Main Store. 506 of MSU 110A. Main Store 506 includes one or more banks of storage devices such as Random Access Memories (RAMs) mapped to approximately one-fourth of the address space of Platform 100. Field 508 is a command that indicates the type of request being performed. As discussed above, command types include Flushes, Fetches, Returns, and I/O Overwrites. Also included in the request is a Job Number 510 used by the I/O Modules 140 and TLCs 310 to match responses provided by the MSU to the initial requests. This is required since responses are not necessarily returned in the same order the requests are issued by the TCMs 220. Finally, each request includes both a Bus and TLC indication shown as Fields 512 and 514, respectively. These Fields are appended to the original command by the TCM 220 to indicate which I/O Module 140 or TLC 310 within a particular POD 120 initiated the request. The TLC Field is set to "1" for a Sub-POD-initiated request, and is set to "0" for a request initiated by an I/O Module. The Bus Field identifies one of the two I/O Modules or TLCs associated with a particular POD 120. Exemplary settings for these Fields are shown in association with the Command/Function Routing Logic 404 of FIG. 4 and Input Interfaces 406.

A request received on MI 130A is stored in Request Storage Device 502 until Processing Logic 516 selects the request for processing according to a predetermined priority scheme. Processing Logic reads the request from Request Storage Device, then reads the entry in Directory Memory 160A corresponding to the requested cache line address. The state of the cache line as indicated by the status information stored in Directory Memory 160A will determine the manner in which the request is processed. In some instances the request may be processed immediately, as is the case if the request includes a Fetch command for a cache line owned by the MSU. In other situations, the MSU may have to generate a request to another POD to obtain the latest copy of the requested data in the manner discussed above.

If Processing Logic 516 determines based on the state of the requested cache line that a request must be performed to another POD, Processing Logic provides a signal on Line 518 to Function Generation Logic 520. This logic uses the state of the cache line provided on Line 522 from Directory Memory 160A, along with the Command Field 508 to build the MSU-to-POD request. This request is stored in a storage device shown as MSU Request Storage Device 524.

Many of the fields included in the MSU-to-POD request are copied from Request Storage Device 502. These copied fields include the Address, Job Number, Bus, and TLC indications shown in Fields 526, 528, 530, and 532 of MSU Request Storage Device, respectively. This request also includes Function Field 534, which is an encoded value generated by Function Generation Logic 520 that indicates the type of operation being requested. Functions include Purges and the various types of Return Functions discussed above.

An MSU-to-POD request also includes Destination Address Field 536. This field indicates which device within the target POD is to receive the request. For all Return Function types, this Destination Address will always identify a single TLC 220. As discussed above, this is because MSUs do not require I/O Modules to perform Return operations. Instead, I/O Modules are allowed to retain cache lines in the I/O Buffers until all pending I/O operations are completed on the buffered data and the cache lines are thereafter returned without prompting. In contrast, a Destination Address associated with a Purge Function may specify either one or more TLCs, or a single I/O Module.

The MSU-to-POD request further includes an indication of the requesting POD as shown in Field 538. This value is appended to the other request information using a POD identifier stored in a storage device shown as Register 540 associated with MI 130A. Each MI is associated with a similar storage device having a uniquely associated identifier, which in the preferred embodiment is a two-bit encoded value. According to the preferred embodiment, these storage devices may be scanned to a particular POD identification value at initialization time using a scan-set interface as is known in the art.

When the MSU-to-POD request has been constructed by Function Generation Logic 520, it may be provided to Routing Logic 542 for routing to the particular one of the MIs 130A, 130B, 130C or 130D based on the POD ID Field 538.

As discussed above, the foregoing description relates to requests received from MI 130A. However, it will be understood that Function Generation Logic 520 and Routing Logic 542 processes requests received on all of the MIs 130 in a similar manner.

Before continuing a discussion related to MSU-to-POD request processing, several aspects of the data by-pass system are discussed further in reference to prior art memory platforms. The U.S. patent application entitled "Directory-Based Cache Coherency System Supporting Multiple Instruction Processor and Input/Output Caches", referenced above, discusses a multi-processor platform that does not employ the by-pass mechanism of the current invention. Because a by-pass mechanism is not utilized, the destination unit that receives a Return Function, as is identified by Destination Address Field 536, is not required to know which I/O Module 140 or TLC 310 initiated a particular request. This is because the destination unit will always respond to the MSU, which, in turn, will route any modified cache line data along with an appropriate response back to the requesting unit. For this reason, the POD ID, Bus and TLC Fields 538, 530, and 532, respectively, need not be included in the request. However, in the system of the current invention, this information must be transmitted to the destination unit so that appropriate by-pass responses may be generated in a manner to be discussed below.

The current by-pass system further requires that the Job Number indicator in Field 528 be provided to the POD in the MSU-to-POD request. This would not be necessary if a by-pass mechanism were not employed, since the MSU would ultimately be responsible for providing the Job Number along with the response back to the requesting unit. As discussed above, this Job Number allows the requesting unit to match a response to the original request, which is necessary because responses are not returned in the same order as the requests are submitted. However, when a by-pass operation is used, the MSU does not provide the response. Instead, a TCM or TLC is responsible for generating the response that includes the appropriate Job Number, and thus these units must have visibility to this information.

According to one embodiment of the current Platform 100, the MSU stores a portion of the information received in any Fetch request in a storage device shown as Request Memory 544 before providing the resulting MSU-to-POD Return function to the TCM. This stored information includes Job Number Field 502, a portion of Address Field 504, and an additional field (not shown in FIG. 5) that specifies "container order" information. The container order indicates the order in which the current owner is to return a 64-byte cache line of data to the requesting POD. In some instances, the container order field specifies that data should be returned in an out-of-order fashion so that the requesting IP can obtain requested instructions and operands as quickly as possible.

Information saved in Request Memory 544 is included with any MSU-to-POD Return function. However, this information is not returned by the TCM with the POD-to-MSU Return command. This data is omitted because of the encoded format required by the command field. Each MI 130 is not wide enough to accommodate the format of the command while also transferring all address and container field bits. Thus, this information must be retained within the MSU, and associated with any modified returned data using the Job Number Field. This can be accomplished because the Job Number Field is both stored in Request Memory 544 with the saved request information, and is further returned by the TCM with any Return command.

The MSU uses the information saved in Request Memory 544 to write any modified cache line data to Main Store 506 after a Return command is issued by a TCM. For example, the container information indicates the order data is returned from the previous owner so that the MSU can write any updated data to Main Store 506 in natural order. The use of the request data is discussed further below.

Figure 6:
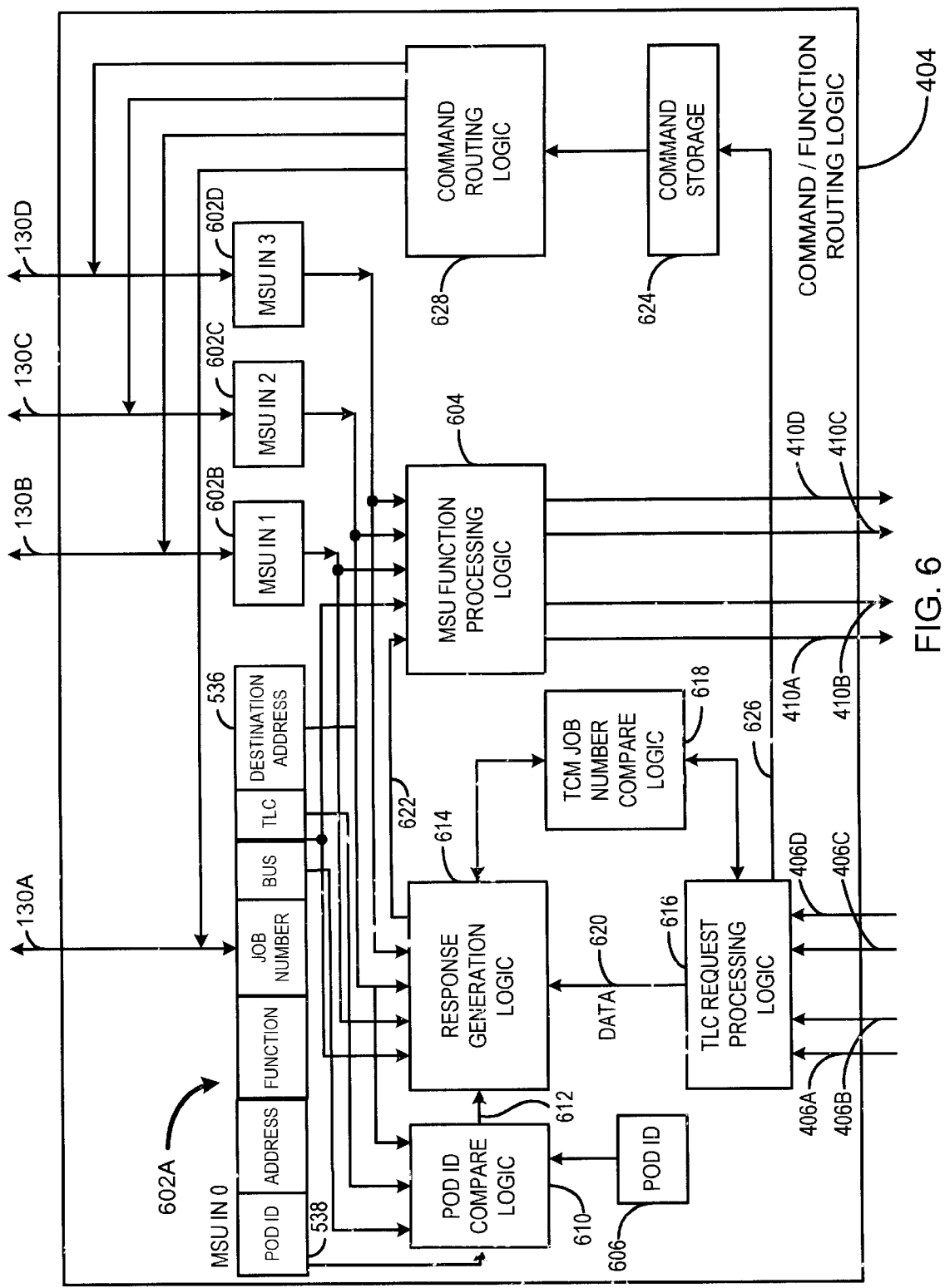
FIG. 6 is a block diagram of Command/Function Routing Logic.

FIG. 6 is a block diagram of Command/Function Routing Logic 404. MSU-to-POD requests are provided on bi-directional MIs 130A, 130B, 130C, and 130D to be stored in one of the storage devices shown as MSU IN 0 602A, MSU IN 1 602B, MSU IN 2 602C, and MSU IN 3 602D. The various fields of the request are shown for the storage device MSU IN 0 602A, and it will be understood requests stored in the other storage devices 602B, 602C, and 602D are similar in content.

MSU Function Processing Logic 604 processes the stored MSU-to-POD requests according to a predetermined priority scheme. MSU Function Processing Logic translates a selected request to the format required by the Sub-POD Interfaces 230A and 230B, and routes the request on one of the Interfaces 410B or 410C to the unit indicated by the Destination Address Field. Recall that the I/O Modules will not be indicated as the destination unit for Return function types since I/O Modules are allowed to store cache lines until all I/O operations are completed.

In addition to routing the request to the appropriate TLC, the TCM Compare Logic further performs a compare function to determine if the current request is eligible to be performed as a by-pass operation. The Compare Logic for performing the by-pass compare function is shown for storage device MSU IN 0 602A, however, it will be understood that similar logic is associated with each of the storage devices 602A–602D. According to one embodiment of the invention, a TCM by-pass operation may occur if the request POD ID Field 538 matches the POD ID stored in Identification Register 606 of the TCM, and the original requester is not. the TLC 310 indicated by the Destination Address Field 536. In other words, the requesting unit may be either a TLC or an I/O Module associated with the same POD as the destination TLC, so long as the requesting unit and the destination unit are not the same TLC.

According to another embodiment, by-pass operations are limited to those instances in which the requesting unit is a TLC, and not an I/O Module. In this alternative embodiment, the Compare Logic identifies those instances in which the request POD ID Field 538 matches the POD ID value provided by the TCM, and the Destination Address Field 536 and Bus and TLC Fields 530 and 532 identify two different TLCs in the same POD 120. This alternative embodiment may be used in those systems in which I/O Modules only receive memory data from an MSU and are not involved in any by-pass operations. In some instances, this may simplify the design of Platform 100.

In either of the above-described embodiments, Identification Register 606 is scannable, and the POD ID value is loaded at system initialization time. POD ID Compare Logic receives the programmable POD ID and provides a signal on Line 612 to enable Response Generation Logic 614 to generate a provisional response if this request is eligible to perform a by-pass operation. This response will include the Job Number Field 510 copied from the MSU-to-POD request, and further includes an encoded value that identifies the data as a response. This provisional response is stored in Response Generation Logic until the TCM determines if the by-pass operation can be completed.

Returning to a discussion related to handling of the request, the TLC 310 addressed in the Destination Address Field 536 will receive the request from the TCM. If the request includes a Return Function, the TLC will determine if it, or one of the SLCs in the Sub-POD, stores a modified copy of the requested cache line. This is accomplished by checking the TLC Directory 315 and, if necessary, placing a request for the cache line on Buses 330A or 330B in the manner discussed above. In some cases, the Sub-POD may not have the requested cache line at all. This will occur if the cache line was flushed from the Sub-POD after the initial request was submitted to the Directory Memory 160 to determine cache line location but before the Return function was provided to the TLC. In these instances, the TLC responds with an indication that the data is not present, and the MSU must supply the most recent cache line copy to the requester.

If the Sub-POD does have a copy of the cache line, the TLC returns its most-recent copy to the TCM along with an indication of the type of return operation being performed. The TLC indicates return type by asserting various control lines on Sub-POD Interface 230A or 230B. The type of return indication will be based, in part, on whether the TLC retains a read-only copy of the cache line as is permitted if the original request is requesting a read-only copy. The type of return indication also depends on whether the cache line was modified. Return types are discussed further below.

After the Sub-POD issues the response to the MSU-to-POD request on Interface 230A or 230B, this response is stored along with any returned data in the associated storage device shown as Sub-POD 0 IN 402B or Sub-POD 1 IN 402C, respectively (FIG. 4). TLC Request Processing Logic 616 processes the stored TLC responses according to a predetermined priority scheme. The TLC response will include the Job Number Field 528 of the original request. This Job Number Field is compared by TCM Job Number Compare Logic 618 to all provisional responses stored in the Response Generation Logic 614. If a match is detected and the response provided by the TLC includes returned data, a by-pass operation may be performed. The returned data is provided by TLC Request Processing Logic 616 to Response Generation Logic 614 via Interface 620, and is appended to the provisional response. This response is made available to MSU Function Processing Logic 604 via Line 622, and will be selected for handling according to a predetermined priority scheme.

In an alternative embodiment, Response Generation Logic 614 does not generate a provisional response at the time the initial request is received. Instead, Response Generation Logic 614 waits until the TLC returns any requested data. At this time, Response Generation Logic uses fields provided in the TLC response, including the Bus Field 530, the TLC Field 532, and Destination Address Field 536, to determine that a bypass operation should be performed. Response Generation Logic generates and buffers the desired response including the response indication, the Job Number Field 528, and the returned data. This response is then provided to MSU Function Processing Logic 604 in the manner discussed above. This alternative embodiment simplifies the design. However, since the by-pass response generation is performed only after the TLC response is received, the response data is available for use in performing the by-pass operation slightly later than in the embodiment discussed above.

When selected for handling by MSU Function Processing Logic 604, a request stored in Response Generation Logic 614 will be translated into the appropriate format as required by MIO Interfaces 150 or Sub-POD Interfaces 230. Then it will be routed to the requesting unit as is indicated by Bus and TLC Fields 530 and 532. That is, instead of routing the data from the TCM 220 to the MSU and back to the same TCM as had been done in prior art systems, the response is routed directly by the TCM to the requesting Sub-POD. This decreases latency, and also decreases the amount of traffic on the MIs 130 so that the efficiency of Platform 100 is improved.

When a by-pass operation is performed, a response is provided directly by the MSU Function Processing Logic 604 to the original requesting unit. A By-pass Return command is also provided by the TCM to the MSU so that the MSU may update the Main Store 506 with any updated data, and further update the Directory Memory 160A with cache line status. The Return command is formatted by TLC Request Processing Logic 616 in response to a signal received by TCM Job Number Compare Logic 618. This Return command is provided to Command Storage 624 via Line 626 to be stored until it can be provided to the addressed one of the MSUs according to a predetermined priority scheme. When the Command Routing Logic 628 determines that a requested one of the MIs 130 is available for use, Command Routing Logic retrieves the respective pending one of the commands stored in Command Storage 624 and routes the command to the addressed MSU 110.

Several types of By-pass Return commands are available for return by the TCM 220 to an MSU 110. A By-pass Return Block command is issued by the TCM when the updated cache line is provided by the previous Sub-POD owner to the requesting unit during a by-pass operation. In this situation, the updated cache line is also returned along with the By-Pass Return Block command to the MSU to allow the MSU to store the updated data. A variation of this command is used when the previous Sub-POD owner retained a copy of the updated cache line for future use. Recall that this is permitted if the requesting unit was only requesting a read-only copy, since read-only copies can be shared by multiple units. In this case, the TCM returns the updated cache line data to the requesting unit during the by-pass operation, and also returns this data to the MSU along with a By-pass Return Update Copy command. The By-pass Return Update Copy command indicates the new shared-copy status of the cache line.

Several other types of By-pass Return commands are used when the previous Sub-POD owner does not have an updated copy of the cache line. In this instance, there is no need for the MSU to store the returned copy of the cache line since the MSU already retains this version of the data. Therefore, according to one embodiment of the by-pass system, the TCM provides the data to the requesting unit during a by-pass operation, but does not return data to the MSU. Instead, the TCM issues a By-pass Return Fast command to the MSU to indicate the occurrence of the by-pass operation, and to allow the MSU to update the status of the cache line in Directory Memory 160. In a similar situation, a previous Sub-POD owner may elect to retain a read-only copy of the unmodified cache line for future use. As discussed above, this is permitted if the requesting unit is only requesting read-only access. To indicate this cache line status to the TCM, the TCM issues a By-pass Return Copy. As in the foregoing example, no cache line data is returned to the MSU with this type of Return command, since the MSU already stores this version of the cache line. This embodiment reduces traffic on the MIs 130 by omitting the extraneous return of data to the MSUs.

According to alternative embodiment of the invention, data may be returned to the MSU with both the By-pass Return Fast and By-pass Return Copy commands to simplify the design. TCM logic is simplified by stipulating that data is to be returned to the MSU in all situations involving a Return command, regardless of whether a by-pass operation occurred or not. The MSU responds by discarding the returned data after it has been determined that a by-pass operation has been performed with an unmodified cache line.

When a By-pass command is received by the MSU 110, the request is stored in Request Storage Device 502 in the manner discussed above with respect to the original requests. Additionally, according to one embodiment of the current system, Processing Logic 516 will compare the Job Number Field that is returned along with each of the Return commands to the Job Number Fields of each of the entries stored in Request Memory 544. In this manner, the Return command is matched with the entry in Request Memory 544 that is associated with the original request. Recall that this entry stores information that was contained in the original request, and which is needed by the MSU in processing the request and providing the response. However, it is not transmitted along with the POD-to-MSU Return command because the number of Address/control lines available on the MI 130 is limited.

Processing Logic 516 uses the information in Request Memory 544 to write any modified returned cache line data to Main Store 506, and to further generate any needed response to the requester. Complete address and container information are provided to the requester with the request acknowledgement and the requested data. Processing Logic further updates the Directory Memory 160A with modified cache line status. After the MSU completes processing of the Return command, Processing Logic 516 deletes the associated entry in Request Memory 544, and the operation is considered complete.

The above scenarios describe TCM by-pass operations in which a TCM 220 provides data from one TLC 310 to another TLC 310 or I/O Module 140 in the same POD 120. The current by-pass system also provides a TLC by-pass mechanism for allowing a TLC to provide data directly from one SLC 360 on a first Bus 330 to another SLC 360 on a second Bus 330 within the same Sub-POD. These types of operations may occur in those situations in which non-inclusive TLC has aged out a cache line, but a copy of the cache line remains resident in one of the SLCs in the Sub-POD. In these instances, another SLC within the same Sub-POD may request the cache line. If the requesting SLC does not reside on the same Bus 330 as the SLC that retains the cache line copy, the FSB Logic 380 of the SLC retaining the copy will not detect the request, and will not respond with data. As a result, the TLC will forward the request to the addressed one of the MSUs 110A through 110D to be handled in the manner discussed above. MSU will respond by providing the Return function to the appropriate TCM 220, which, in turn, will provide the appropriate function to the TLC associated with the Destination Address Field 536. This TLC may then perform a TLC By-pass operation using logic that is similar to that described above in reference to FIG. 6 to transfer a cache line directly from one Bus 330 to another Bus 330. This greatly reduces the latency imposed in prior art systems wherein a cache line is passed from the TLC to the associated TCM, forwarded to the MSU to be returned back to the TCM, and finally passed to the same TLC as originated the transmission.

Figure 7:
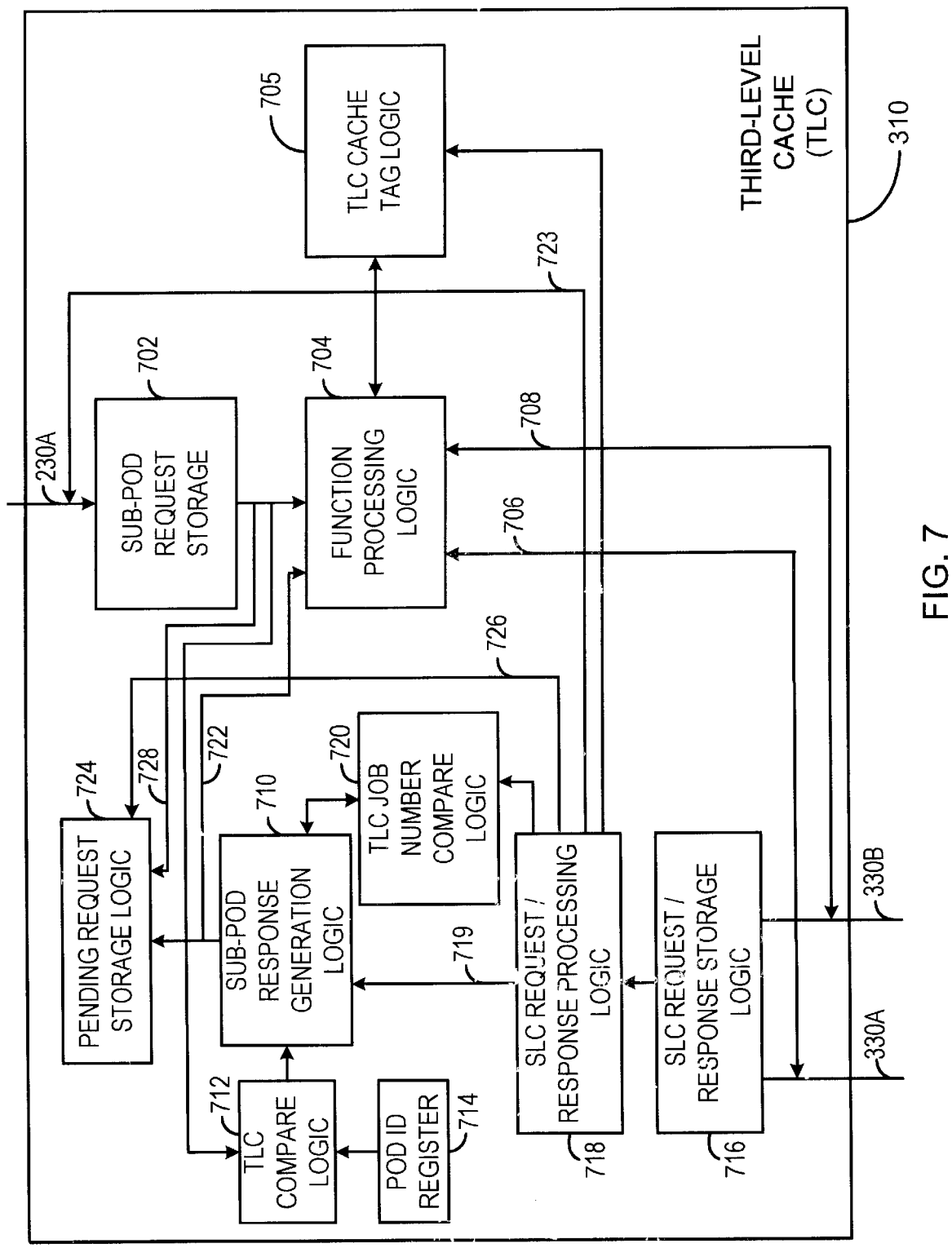
FIG. 7 is a block diagram of the TLC by-pass logic.

FIG. 7 is a block diagram of the TLC by-pass logic. Although TLC 310 of Sub-POD 210A is shown and discussed, it will be understood the description applies equally to all other TLCs in all other Sub-PODs 210 of Platform 100. Return functions are received on Sub-POD Interface 230A from TCM 220. These Return functions are stored in Sub-POD Request Storage 702. Eventually, each request is selected for processing by Function Processing Logic 704 according to a predetermined priority scheme. Function Processing Logic reads cache line state information from TLC Cache Tag Logic 705 to determine which of the Buses 330A or 330B should be issued a return indication for the cache line. The appropriate return indication is then issued on either Bus 330A or 330B via Lines 706 or 708, respectively. If the TLC has aged the cache line out of memory so that no record of the data exists (recall that this is possible because of the non-inclusive cache scheme utilized by the preferred embodiment), the return indication must be provided on both Buses 330A and 330B. As discussed above, this return indication will either direct an SLC to return the cache line and purge all copies, or will allow one or more SLCs to retain a read-only copy.

The request is also processed by Sub-POD Response Generation Logic 710. Sub-POD Response Generation Logic is enabled by TLC Compare Logic 712 to generate a provisional response if the requesting unit and the unit indicated by Destination Address Field 536 are the same TLC 310. This determination is made by comparing POD ID Field 538 to the POD ID in POD ID Register 714 of the TLC, and by further comparing Bus and TLC Fields 530 and 532 to Destination Address Field 536. This provisional response will contain the same fields as those included in responses provided by the MSU, including the Job Number Field 528, and an encoded field indicating that the data is part of a request response. The provisional response is stored in Sub-POD Response Generation Logic 710 along with additional request information such as Bus Field 512, and is available for use in performing a by-pass operation if data is returned to the TLC 310 by an SLC 360. According to one embodiment of the invention, POD ID Register 714 is programmable using a scan-set interface as is known in the art. This register is loaded when the system is initialized with a predetermined POD ID value.

The data return indication provided by TLC 310 is processed by the FSB Logic 380 of both SLCs on the target Bus 330. An SLC retaining a copy of the requested cache line will respond to the function by placing an indication of the return operation on Bus 330 along with the cache line data. In these instances, the responding SLC will also either invalidate the cache line, or retain a read-only copy, as will be determined by the Return function and other SLC state information. In other instances, neither SLC will have a copy of the requested cache, since the cache line was flushed back to the MSU after the Directory Memory 160A was referenced during processing of the original request, and the SLCs will respond accordingly with a no-data-present indication to the TLC.

When the response and any cache line data are returned to the TLC 310, the information is stored in SLC Request/Response Storage Logic 716 until it can processed by SLC Request/Response Processing Logic 718. At this time, TLC Job Number Compare Logic 720 compares the Job Number of the response to the Job Number Fields of all provisional responses stored in Sub-POD Response Generation Logic 710. If a match is detected and data is returned with the response, the returned cache line data is copied from SLC Request/Response Storage Logic 716 to Sub-POD Response Generation Logic via Interface 719 to be appended to the matching provisional response. This response is made available to Function Processing Logic 704 via Interface 722. Function Processing Logic 704 will process all MSU-to-Sub-POD requests along with the responses stored in Sub-POD Response Generation Logic 710 according to a predetermined priority scheme. Each of the stored provisional responses will eventually be routed by Function Processing Logic 704 via Lines 706 or 708 to the one of the Buses 330 that is identified by Bus Field 512 associated with the response.

In addition to performing the by-pass operation, the TLC also provides a return indication to the TCM to notify that the by-pass operation has occurred. This indication is provided on Line 723 to Sub-POD Interface 230A. The types of return indications provided by the TLC to the TCM are similar to those discussed above in reference to the TCM. These include return indications provided with modified cache line data indicating that the previous owner either purged the cache line or retained a read-only copy. Other return designations are used to indicate that an unmodified cache line is provided to the requester, with the previous owner's copy either being purged or retained in a read-only capacity. Yet another indication may be provided if data was not present in either SLC. In this case, the MSU must process the request and provide the cache line data to the requester in the manner discussed above. In the preferred embodiment, unmodified cache line data is not returned to the MSU with a return indication since the MSU already has a copy of the cache line in Main Store 506. This minimizes traffic on the MIs 130. According to an alternative embodiment, the data may be returned to simplify design of the TCM in the manner discussed above.

When a by-pass operation is performed within the TLC, Function Processing 704 compares the by-pass response retrieved from Sub-POD Response Generation Logic to locate a corresponding entry in Pending Request Storage Logic 724. Pending Request Storage Device stores a copy of each original TLC-to-MSU request when Sub-POD Request/Response Processing Logic 718 processes these original requests. In this manner, any outstanding and unacknowledged requests that are recorded as pending for more than a predetermined period of time can be used to generate an error indication to the MSU. In the current example, the by-pass response is matched to the original fetch request using the Job Number indication, and the matching request entry is removed from the Pending Request Storage Logic. This process is also performed for responses received from the MSU, which are provided via Interface 230A to Sub-POD Request Storage 702, and which are provided to Pending Request Storage Logic on Line 728 for comparison to original requests.

The above description relates to by-pass operations performed by either a TCM 220 or a TLC 310. In those situations in which a by-pass operation may not be performed because the requesting unit and the previous owner TLC are not in the same POD 120, or because the previous owner did not have a copy of the requested data, the return responses and data are provided solely to the MSU. The Return command is provided on the MI 130 to the addressed one of the MSUs along with the returned data. The MSU utilizes the expedited routing capability discussed above to route the returned data to the requesting POD specified in POD ID Field 538. This cache line data is provided with a request acknowledgement that includes the original Job Number Field, a response indication, the Bus Field 512, and the TLC Field 514. In turn, the TCM routes the response to the appropriate TLC 310 or I/O Module 140 for processing in the manner discussed above.

In addition to performing the MSU by-pass operation, the MSU also stores the Return command with the associated Job Number Field and cache line address in Request Storage Device 502 with other requests received from the Sub-PODs 210. When the request is processed by Processing Logic 516, Directory Memory 160A is updated with modified cache line status, and any updated cache line data is written to Main Store 506. These memory operations are completed using the matching request entry retrieved from Request Memory 544 in the manner discussed above.

As mentioned above, in some instances a by-pass operation can not be performed because the Sub-POD that is identified as the destination unit does not store the requested cache line. This will occur if the cache line was flushed from the Sub-POD after the request was initially submitted to the Directory Memory 160 to determine cache line location but before the Return function was provided to the TLC. In these instances, the TLC responds with an indication that the data is not present. The absence of data is detected by the TLC Request Processing Logic 616, and a by-pass operation is not performed. Instead, the response is routed to the appropriate MI Interface via Command Routing Logic 628, and is processed by the MSU 110 in the manner described above. That is, the MSU retrieves the requested data from Main Store 506, updates the Directory Memory 160A with new status, and provides the requested cache line to the requester along with the Job Number, a response indication, the Bus Field 512, and the TLC Field 514. The entry associated with the Job Number stored in Request Storage Device 502 is deleted after the response has been provided to the requester.

It may be noted that the data by-pass system of the current invention minimizes the time required to complete the aforementioned type of requests even for those requests that do not utilize one of the cache by-pass mechanisms. This is so because the by-pass system eliminates some of the data transfers that would otherwise occur on the MIs, allowing the remaining transfers to be completed more quickly.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. For use in a hierarchical memory including a main memory coupled to multiple cache memories, a memory by-pass system, comprising:
    a first request processing circuit coupled to receive a request from the main memory, said request being initiated by any of the cache memories, said first request processing circuit to provide said request to an addressed one of the cache memories to cause said addressed one of the cache memories to return requested data signals to the main memory; and
    a first response generation circuit coupled to said first request processing circuit, to at least one associated one of the cache memories and to said addressed one of the cache memories, said first response generation circuit to receive from said addressed one of the cache memories said requested data signals, said first response generation circuit to generate a response including said requested data signals and that is to be provided directly to a cache memory that initiated said request if said cache memory that initiated said request is said at least one associated one of the cache memories.

2. The system of claim 1, wherein the main memory includes multiple memory units, and further including multiple input storage devices coupled to said first request processing circuit, each of said multiple input storage devices coupled to a respective one of the multiple memory units to receive requests from said respective one of the multiple memory units to be processed by said first request processing circuit.

3. The system of claim 2, and further including routing logic coupled to said first response generation circuit to route said requested data signals to an addressed one of the memory units that is indicated by said request.

4. The system of claim 1, and further including a compare circuit coupled to said first response generation circuit to programmably determine whether said cache memory that initiated the request is one of said at least one associated one of the cache memories.

5. The system of claim 1, wherein said addressed one of the cache memories is a third-level cache memory respectively coupled in a hierarchical configuration to additional ones of the cache memories that are second-level cache memories, and further including a second request processing circuit associated with said addressed one of the cache memories, said second request processing circuit to forward said request to any of said second-level cache memories storing said requested data signals to cause said any of said second-level cache memories to return said requested data signals to said first response generation circuit.

6. The system of claim 5, and further including a second response generation circuit coupled to said second request processing circuit and to each of said second-level cache memories, said second response generation circuit to receive said requested data signals from a first second-level cache memory and to generate a response including said requested data signals to be provided directly to a second one of said second-level cache memories if said cache memory that initiated the request is said second one of said second-level cache memories.

7. The system of claim 6, wherein said second response generation circuit includes an interface to provide said requested data signals to said first response generation circuit, and whereby said first response generation circuit further includes an interface to provide said requested data signals to the main memory to be stored by the main memory.

8. The system of claim 1, wherein said first response generation circuit includes an interface to provide said requested data signals to the main memory to be stored by the main memory.

9. The system of claim 8, wherein said first response generation circuit includes a circuit to determine whether a copy of said requested data signals is stored in the main memory, and whereby said requested data signals are only provided by said interface to the main memory if said copy of said address data signals is not stored in the main memory.

10. For use within a hierarchical memory system including a main memory coupled to multiple first storage devices, and wherein each of the first storage devices is respectively coupled to respective other second storage devices, each of the first and second storage devices to store selected data signals retrieved from the main memory, predetermined ones of the multiple first storage devices each being coupled to at least one other associated one of the multiple first storage devices via a respective by-pass path, the method of managing the hierarchical memory system, comprising the steps of:
    (a) providing a request from a requesting one of the first storage devices to the main memory, said request requesting a copy of addressed ones of the data signals stored in the main memory;
    (b) generating a memory request from the main memory to a second one of the first storage devices to allow the main memory to retrieve the latest copy of said addressed ones of the data signals;
    (c) retrieving said latest copy of said addressed ones of the data signals from said second one of the first storage devices to be provided to the main memory; and
    (d) routing said latest copy of said addressed ones of the data signals from said second one of the first storage devices directly to said requesting one of the first storage devices if said second one of the first storage devices and said requesting one of the first storage devices are coupled to each other via one of the respective by-pass paths.

11. The method of claim 10, and further including the step of routing said latest copy of said addressed ones of the data signals from said second one of the first storage devices to the main memory and back to said requesting one of the first storage devices if said second one of the first storage devices and said requesting one of the first storage devices are not coupled to each other via one of the respective by-pass paths.

12. The method of claim 10, wherein step (d) is performed only if said latest copy of said addressed ones of the data signals is not the same copy of the addressed ones of the data signals stored in the main memory.

13. The method of claim 10, wherein the hierarchical memory system further includes second storage devices each being coupled to a respective one of the multiple first storage devices each for storing selected ones of the data signals retrieved from the main memory, the method further including the steps of:

routing said memory request from said second one of the first storage devices to one or more of the second storage devices coupled to said second one of the first storage devices;

retrieving said latest copy of said addressed ones of the data signals from said one or more of the second storage devices; and providing said latest copy of said addressed ones of the data signals from said one or more of the second storage devices to said second one of said first storage devices.

14. The method of claim 13, wherein each of the first storage devices is coupled to respective multiple ones of the second storage devices and ones of said respective multiple ones of the second storage devices are coupled to each other via one of the respective by-pass paths, and whereby a request to main memory provided by said requesting one of the first storage devices may be initiated by a respectively coupled second storage device, the method further including the step of routing said latest copy of said addressed ones of the data signals directly from said one or more of the second storage devices to a different respectively coupled one of the second storage devices if said different respectively coupled one of the second storage devices initiated the request.

15. The method of claim 10 wherein the main memory includes a directory memory to record the location in the hierarchical memory system of the latest copy of all data signals, the method further including the step of updating the directory memory after step (d) to record the location of said latest copy of said addressed ones of the data signals.

16. A hierarchical memory system, comprising:

a main memory to store data signals;

multiple first memories coupled to said main memory each to initiate requests to said main memory to obtain a copy of requested ones of said data signals stored by said main memory, wherein ones of said requests are each routed by said main memory to a respectively selected one of said first memories to cause said selected one of said first memories to retrieve said requested ones of the data signals to be returned to said main memory to be further forwarded to the one of said first memories initiating said request; and a by-pass circuit coupled to at least two of said first memories to intercept said requested ones of said data signals retrieved from any of said at least two of said first memories and to provide intercepted ones of said data signals directly to a different one of said at least two of said first memories if said different one of said at least two of said first memories is the one of said first memories initiating the request associated with said requested ones of the data signals.

17. The system of claim 16, and further including:

multiple second memories, each of said multiple second memories being coupled to a respective one of said first memories, each to cause said respective one of said first memories to initiate ones of said requests to said main memory, wherein ones of said requests that are routed by said main memory to a selected one of said first memories to cause said selected one of said first memories to retrieve said requested ones of the data signals from a selected said respectively coupled one of said second memories to be returned to said main memory to be further forwarded to the one of said first memories initiating said request; and a second by-pass circuit coupled to at least two of said second memories to intercept said requested ones of the data signals retrieved from said selected respectively coupled one of said second memories to be provided directly to a different one of said at least two of said second memories if said different one of said at least two of said second memories caused the request associated with said requested ones of the data signals to be initiated.

18. The system of claim 16, and further including a routing circuit coupled to said by-pass circuit to further pass said intercepted ones of said data signals to said main memory if said intercepted ones of said data signals are not already stored in said main memory.

19. The system of claim 18, wherein said main memory includes a storage device to temporarily store request signals for each of said requests, said request signals being used by said main memory to store said intercepted ones of said data signals that are not already stored in said main memory.

20. The system of claim 16, wherein said by-pass circuit includes a circuit to generate an indication to said main memory that said requested ones of said data signals have been provided directly to said different one of said at least two of said first memories, and wherein said main memory includes a circuit to record that said data signals have been provided directly to said different one of said at least two of said first memories.

* * * * *